United States Patent [19]

Butt

[11] Patent Number: 5,743,557
[45] Date of Patent: Apr. 28, 1998

[54] HYBRID INFLATOR

[75] Inventor: Ron J. Butt, Castlerock, Colo.

[73] Assignee: Amphenol-Tuchel Electronics GmbH, Heilbronn, Germany

[21] Appl. No.: 643,927

[22] Filed: May 7, 1996

[51] Int. Cl.⁶ .................................................. B60R 21/26
[52] U.S. Cl. .......................... 280/737; 149/19.4; 149/19.6; 280/741
[58] Field of Search ................................ 149/19.6, 19.4; 280/741, 737

[56] References Cited

U.S. PATENT DOCUMENTS

| | | | |
|---|---|---|---|
| 3,895,821 | 7/1975 | Schotthoefer et al. | 280/741 |
| 4,288,262 | 9/1981 | Flanagan et al. | 149/19.6 |
| 4,379,894 | 4/1983 | Frankel et al. | |
| 4,379,903 | 4/1983 | Reed, Jr. et al. | |
| 4,707,199 | 11/1987 | Sayles | 149/19.6 |
| 4,976,795 | 12/1990 | Perotto | |
| 5,133,183 | 7/1992 | Asaoka et al. | |
| 5,152,136 | 10/1992 | Chew et al. | |
| 5,263,740 | 11/1993 | Frey et al. | |
| 5,319,037 | 6/1994 | Ochoa Gomez et al. | |
| 5,359,012 | 10/1994 | Ampleman | |
| 5,394,690 | 3/1995 | Arszman et al. | 60/233 |
| 5,507,891 | 4/1996 | Zeigler | 149/19.6 |
| 5,623,121 | 4/1997 | Schedlbauer | 149/19.6 |

FOREIGN PATENT DOCUMENTS 2264772   9/1993   United Kingdom.

*Primary Examiner*—Edward A. Miller
*Attorney, Agent, or Firm*—Bacon & Thomas

[57] ABSTRACT

A hybrid inflator apparatus (10) for inflating a vehicle occupant protection device comprises a container (12). A gas (30) is stored in the container (12) under pressure. A body (80) of ignitable material is stored within the apparatus (10), also under pressure. An igniter (50, 60) ignites the body (80) of ignitable material. The body (80) of ignitable material consists essentially of a solid organic polymer which is self-combustible at the pressure under which it is stored. Preferably, the organic polymer is self-extinguishing at atmospheric pressure and is formed, for instance by extrusion or molding, into a shape comprising at least one passage extending through the body. A preferred organic polymer is a cured glycidyl azide polymer (GAP). The stored gas (30) preferably comprises an inert gas which may be mixed with a small amount of oxygen.

17 Claims, 2 Drawing Sheets

HYBRID INFLATOR

FIELD OF THE INVENTION

The present invention relates to an apparatus for use in inflating a vehicle occupant protection device, such as an air bag. The present invention particularly relates to a hybrid inflator.

BACKGROUND OF THE INVENTION

A hybrid inflator for inflating a vehicle occupant protection device includes a quantity of a stored inert gas and a body of ignitable pyrotechnic material. An igniter is actuatable to ignite the body of pyrotechnic material. As the body of pyrotechnic material burns, combustion products heat the stored gas. This increases the pressure of the stored gas.

Typically, the prior art hybrid inflators require a relatively large amount of pyrotechnic material to generate a sufficient amount of combustion products for heating the stored gas. Also, the prior art hybrid inflators typically require filters for filtering solid particulates produced during the combustion of the pyrotechnic material. Such filters add to the weight and cost of the inflator.

SUMMARY OF THE INVENTION

The present invention relates to a hybrid inflator apparatus for inflating a vehicle occupant protection device. The apparatus comprises a container. A quantity of gas is stored in the container under pressure. The apparatus also comprises a body of ignitable material and an igniter for igniting the body of ignitable material. The body of ignitable material preferably is under an elevated pressure. The body of ignitable material consists essentially of a solid organic polymer which is self-combustible at said elevated pressure. By self-combustible, it is meant that the organic polymer burns by itself, when under pressure, without the need of a separate oxidizing agent. Preferably, the organic polymer is self-extinguishing at atmospheric pressure. A preferred organic polymer is a glycidyl azide polymer (GAP), preferably a cured glycidyl azide polymer. At least a predominant portion of the stored gas is an inert gas. Combustion of the organic polymer produces combustion products which heat the stored gas and increase its pressure. The stored gas may also comprise a small amount of oxygen effective to oxidize any monoxide gas in the combustion products to a dioxide.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

General Description

Figure 1:
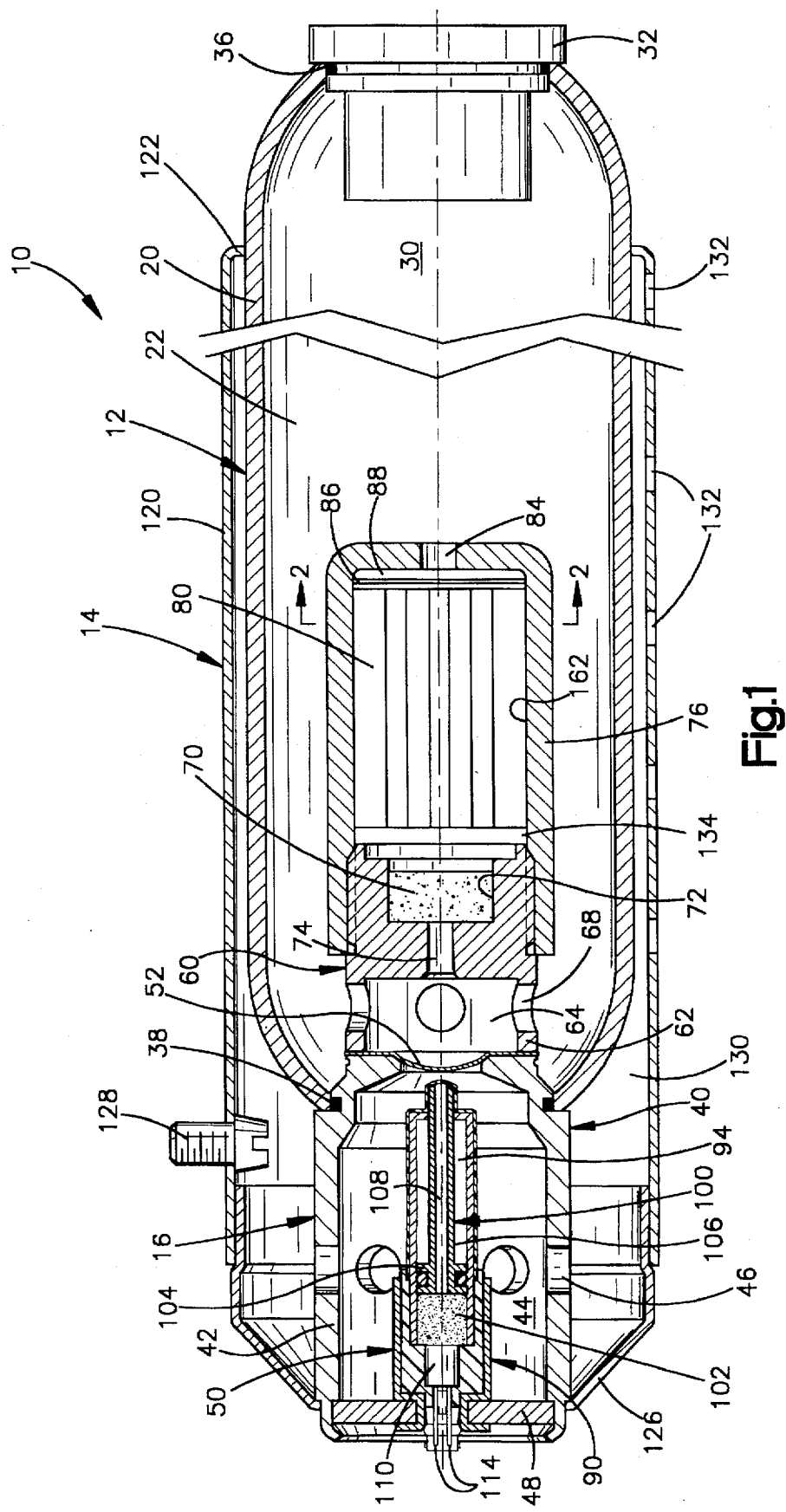
FIG. 1 is a sectional view of an inflator assembly which is constructed in accordance with the present invention.

The present invention relates to an inflator for inflating a vehicle occupant protection device, such as an air bag, and particularly to a hybrid inflator for inflating an air bag to protect an occupant of a vehicle. The present invention is applicable to various inflator constructions. As representative of the present invention, FIG. 1 illustrates an inflator assembly 10. The inflator assembly 10 includes a generally cylindrical container 12, a generally cylindrical diffuser 14, and a manifold assembly 16.

The container 12 includes a generally cylindrical one-piece steel wall 20 which defines a chamber 22. The container wall 20 may have a length of approximately 230 millimeters, an outside diameter of approximately 59 millimeters, and a thickness of approximately 2.5 millimeters. It should be understood that the foregoing specific dimensions for the wall 20 are set forth for purposes of clarity of description only. The inflator assembly 10 may be constructed with dimensions and materials which are substantially different from the foregoing.

The chamber 22 is filled with a gas 30 under pressure which is introduced into the chamber through an end cap 32. The end cap 32 extends through an opening at one end of the container 12 and is connected to the container by a friction weld 36. The end cap 32 includes a passage (not shown) through which the gas 30 is conducted into the chamber 22. Once the chamber 22 has been filled with gas 30 at a desired pressure, the passage is closed. The gas 30 is preferably stored in the container 12 at a pressure of about 500 to 5,000 psi, preferably about 2,000 to 3,500 psi. The end cap 32 may also include a conventional pressure switch (not shown) from which the gas pressure in the chamber 22 can be monitored to alert a passenger in a vehicle (not shown) if the gas pressure in the chamber 22 drops below a set pressure.

The manifold assembly 16 is secured to an end of the container 12 opposite from the end cap 32 by a friction weld 38 and projects both axially into and axially away from the container 12. The manifold assembly 16 includes a generally cylindrical metal manifold plug 40 which is disposed partially outside of the container 12. The manifold plug 40 includes a generally cylindrical side wall 42 which defines a generally cylindrical interior cavity 44. A plurality of circular outlet openings 46 are disposed in a circular array in the manifold side wall 42. The outer end of the manifold plug 40 is closed by a circular end wall 48. An actuator assembly 50 is disposed in the manifold end wall 48 and extends into the manifold cavity 44.

A burst disk 52 extends across a circular opening at the interior end of the manifold plug 40. The burst disk 52 blocks gas flow from the chamber 22 of container 12 into the manifold cavity 44 until the burst disk 52 is ruptured by the actuator assembly 50.

The manifold assembly 16 also includes a cylindrical metal holder 60 which is coaxial with the manifold plug 40 and is disposed within the container 12. The holder 60 includes a generally cylindrical side wall 62 which defines a generally cylindrical cavity 64. The holder 60 is welded to the burst disk 52 which in turn is welded to the interior end of the manifold plug 40. The manifold plug 40, holder 60 and the burst disk 52 are thus all welded together to form the unitary manifold assembly 16.

A plurality of circular inlet openings 68 are arranged in a circular array in the holder side wall 62. The openings 68 provide fluid communication between the chamber 22 of container 12 and the holder cavity 64.

A booster charge 70 is disposed in a cylindrical chamber 72 formed in the end of the manifold holder 60 removed from the burst disk 52. The holder chamber 72 is connected in fluid communication with the holder cavity 64 through a generally cylindrical opening 74. The holder chamber 72 and opening 74 are coaxial with the burst disk 52 and the actuator assembly 50.

A generally cylindrical metal housing 76, having a chamber 134, encloses a body 80 of pyrotechnic material disposed within the chamber 134. One end of the housing 76 is disposed adjacent the manifold holder 60 and has a threaded, interior circumferential surface. The threaded surface of the housing 76 engages a threaded, exterior circumferential surface on the manifold holder 60 so that the housing 76 is mounted on the manifold holder 60. The housing 76 is coaxial with the holder 60 and the booster charge 70 in the holder chamber 72.

The booster charge 70 is readily ignited to ignite the body 80 of pyrotechnic material. The booster charge 70 is securely held in the chamber 72 and is enclosed by a thin covering of polymeric material (not shown) which is destroyed upon burning of the booster charge. The ignitable material forming the booster charge 70 is preferably boron potassium nitrate ($BKNO_3$), but could have a different composition if desired.

At its end opposite from the manifold assembly 16, the housing 76 is substantially closed except for a circular orifice 84. The housing orifice 84 is disposed in a coaxial relationship with the housing chamber 134 and the body 80 of pyrotechnic material. The inside of the housing chamber 134 is in fluid communication with the chamber 22 in the container 12 through the housing orifice 84. The orifice 84 is continuously open so that the gas 30 stored in the chamber 22 can flow into the housing chamber 134 around the body 80 of pyrotechnic material.

Disposed between the body 80 of pyrotechnic material and the orifice 84 are a flat baffle plate 86 and a flat circular orifice plate 88 through which an orifice (not shown) extends. These plates 86 and 88 help retain the body 80 of pyrotechnic material within the chamber 134. During burning of the body 80 of pyrotechnic material, combustion products from the burning pyrotechnic material impinge against the baffle plate 86. After passing the baffle plate 86, the combustion products enter into the chamber 22 through the orifice plate 88 and the housing orifice 84.

The actuator assembly 50 includes a cylindrical housing 90 having a cylindrical chamber 94 in which a piston 100 and a pyrotechnic charge 102 of ignitable material are disposed in a coaxial relationship. The actuator housing 90 is secured to the manifold end wall 48 and is disposed in a coaxial relationship with the burst disk 52, the booster charge 70 and the body 80 of pyrotechnic material. The diameter and length of the actuator assembly 50 are sufficiently smaller than the diameter and length of the manifold cavity 44 so that the stored gas 30 can flow from the chamber 22 and cavity 64 through the manifold cavity 44 to the manifold outlet openings 46 when the burst disk 52 is ruptured.

The piston 100 is formed from a single piece of metal and has a cylindrical head end portion 104. A smaller diameter cylindrical piston rod 106 extends axially away from the head end portion 104. A cylindrical central passage 108 is coaxial with and extends through the head end portion 104 and piston rod 106 of the piston 100. The cylindrical piston rod 106 has a tip at its outer end portion.

The pyrotechnic charge 102 is disposed in the actuator chamber 94 in a position which is adjacent to the head end portion 104 of the piston 100. A squib 110 is located adjacent the pyrotechnic charge 102. Two electrically conductive pins 114 are connected with the squib 110. The pins 114 extend through an opening in the manifold assembly 16. The pins 114 provide a path for electrical current to actuate the squib 110.

The pyrotechnic charge 102, by way of example, has the following composition:

| % By Weight | Ingredient |
| --- | --- |
| 72% | Boron potassium nitrate ($BKNO_3$) |
| 14% | Titanium hydride |
| 14% | Potassium perchlorate |

The diffuser 14 is larger in diameter than the container 12 and is mounted on the outside of the container 12 to encircle both the container 12 and the manifold assembly 16. The diffuser 14 also extends substantially the entire length of the manifold assembly 16 and a significant portion of the length of the container 12.

The diffuser 14 includes a cylindrical diffuser tube 120 having an annular, radially inwardly directed lip 122 at one end. The lip 122 tightly engages a cylindrical outer side surface of the container wall 20. An end cap 126 is welded to the end of the diffuser tube 120 opposite from the inturned lip 122. The end cap 126 is connected to an outer end portion of the manifold assembly 16. A mounting stud 128 is connected with the diffuser tube 120 adjacent the end cap 126. The mounting stud 128 is used to mount the inflator assembly 10 to a reaction can (not shown) which can be mounted at a desired location in the vehicle. The diffuser 14 defines a diffuser chamber 130 around the manifold assembly 16 and the container 12. The diffuser 14 has openings 132 which provide fluid communication from the diffuser chamber 130 to an inflatable vehicle occupant protection device (not shown).

The squib 110 of the actuator assembly 50 is connected through pins 114 to a sensor (not shown) which is capable of sensing vehicle deceleration. In the event of sudden vehicle deceleration above a predetermined deceleration, the sensor causes an electric current to flow to the squib 110. This in turn causes the squib 110 to ignite the pyrotechnic charge 102. Burning of the pyrotechnic charge 102 forces the piston rod 106 to move axially and penetrate the burst disk 52. Burning gases from the pyrotechnic charge 102 flow through the passage 108 and ignite the booster charge 70. The burning booster charge 70, in turn, ignites the body of pyrotechnic material 80.

As the body 80 of pyrotechnic material burns, hot combustion products flow through the orifice 84 to heat the stored gas 30 in chamber 22 of the container 12. This increases the pressure within the chamber 22.

When the pressure in the chamber 22 reaches a predetermined pressure, the burst disk 52 ruptures. Upon rupturing of the burst disk 52, the stored gas 30 and the combustion products provide an inflation fluid which flows from the chamber 22 through the manifold inlet openings 68 into the manifold assembly 16. The inflation fluid then flows through the manifold assembly 16 into the manifold cavity 44, and then through the manifold outlet openings 46 into the diffuser chamber 130. The inflation fluid then flows from the diffuser 14 through openings 132 into the vehicle occupant protection device.

Body of Pyrotechnic Material

Figure 2:
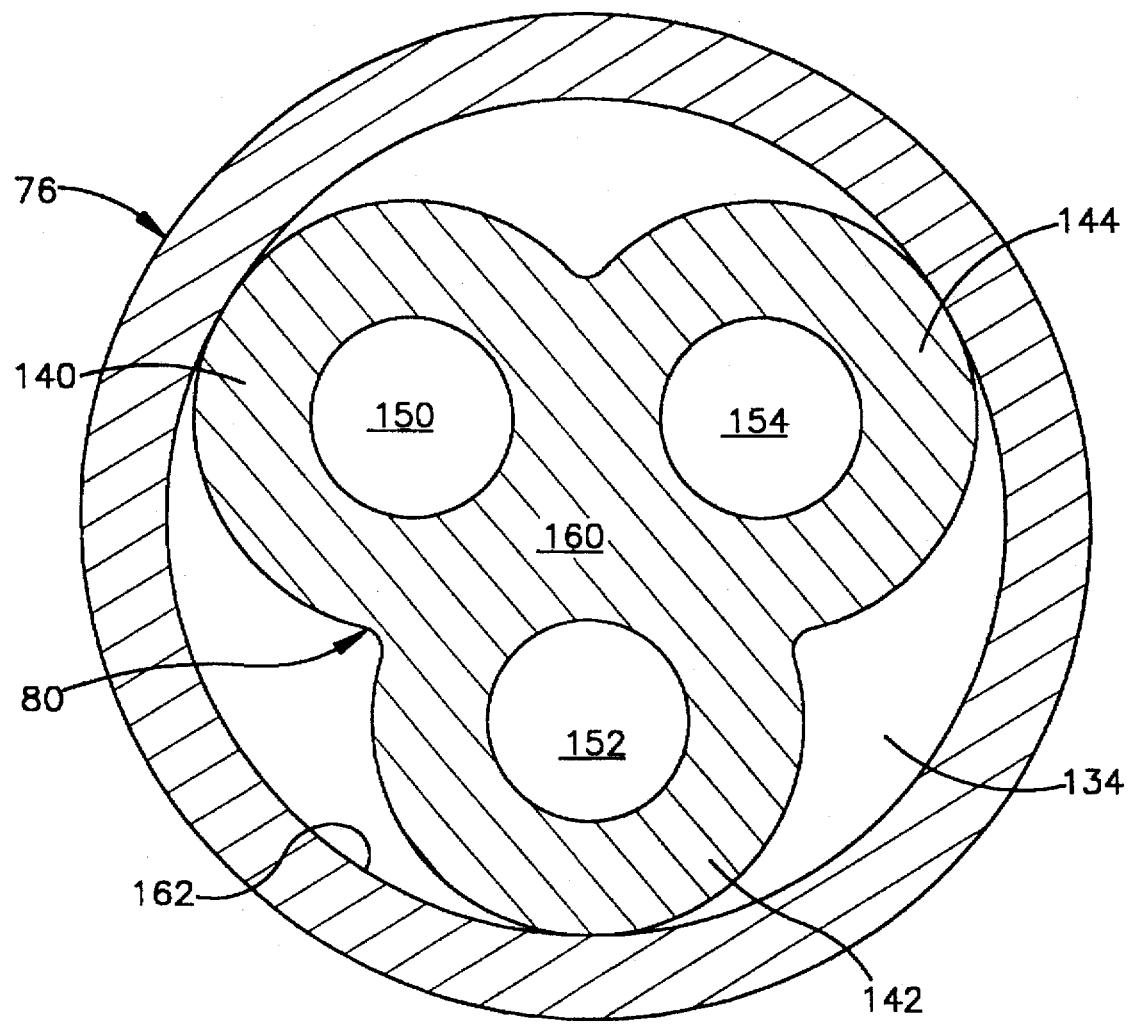
FIG. 2 is a sectional view of parts of the inflator assembly of FIG. 1 taken along line 2—2 of FIG. 1.

The body 80 of pyrotechnic material has a three-lobed cross sectional configuration as can be seen in FIG. 2. Specifically, the body 80 of pyrotechnic material has lobes 140, 142, and 144 which extend throughout the axial extent of the body of pyrotechnic material. Straight cylindrical passages 150, 152, and 154 extend parallel to each other and axially through the respective lobes 140, 142, and 144. The lobes 140, 142, and 144 and passages 150, 152, and 154 are disposed in a circular array about a solid central portion 160 of the body 80 of pyrotechnic material. The lobes 140, 142, and 144 of the body 80 of pyrotechnic material have an interference fit with a cylindrical inside surface 162 of the housing 76 to support the body 80 of pyrotechnic material firmly in the housing.

The configuration of FIG. 2 is useful in the ignition and combustion of the body 80 of pyrotechnic material. The lobes 140, 142 and 144 provide open spaces in the chamber 134. These open spaces plus the passages 150, 152 and 154 allow burning booster charge material to penetrate deeply into the chamber 13.4 and increase the rate of ignition of the body 80 of pyrotechnic material. The open spaces and passages 150, 152 and 154 also increase the rate of combustion of the body 80 of pyrotechnic material. The body 80 of pyrotechnic material can, however, be configured to have other sizes and shapes, if desired.

The body 80 of pyrotechnic material consists essentially of a solid organic polymeric material which is self-combustible at the pressure of the stored gas 30 within the container 12. For purposes of the present application, the term self-combustible means that the organic polymer burns by itself, when under pressure, without the need of a separate oxidizing agent. Preferably, the organic polymer is self-extinguishing at atmospheric pressure. A preferred organic polymer is a glycidyl azide polymer (GAP), preferably a cured glycidyl azide polymer (cured GAP). Under a pressure above about 500 psi within the container 12, the GAP or cured GAP has good ignition and burning characteristics and reliably ignites and burns without the presence of a separate oxidizing agent.

GAP can be obtained by reacting polyepichlorohydrin (PECH) with a metallic azide in an organic solvent at a temperature above about 90° C. according to the following reaction:

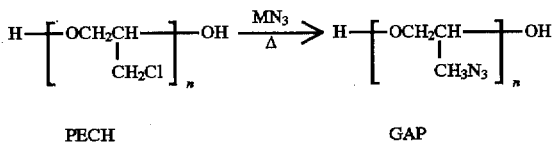

PECH            GAP wherein n is an integer between 5 and 43.

A preferred metallic azide ($MN_3$) is sodium azide ($NaN_3$). The reaction is carried out in the heterogeneous phase since the metallic azide is practically insoluble in an organic solvent. The reaction as shown is diagrammatical only. The chlorine in the epichlorohydrin reacts with the metal (M) of the metal azide to form an insoluble metal halide salt which is filtered from the reaction product. The reaction product is then subjected to distillation allowing recovery of the solvent and providing the GAP product. Examples of organic solvents useful in the preparation of GAP are dimethyl acetamide, N-methyl pyrrolidine and dimethyl formamide.

The GAP is hydroxy ended and has a functionality (number of OH molecule groups) of two or more.

The present invention is particularly useful with cured GAP. Cured GAP is prepared by polymerizing GAP, for instance the diol or triol, with a di- or tri-functional isocyanate such as isophorone diisocyanate or hexamethyl diisocyanate.

A preferred GAP prepolymer is one manufactured by the Specialty Chemicals Division of 3M Company, of St. Paul, Minn., marketed under the trade designation "3M GAP5527". This prepolymer is cured with a conventional isocyanate used for curing.

An important advantage associated with the body 80 of pyrotechnic material consisting essentially of GAP or cured GAP is that the GAP and cured GAP are free of halogen atoms. The combustion products of GAP and cured GAP are essentially nitrogen ($N_2$), water vapor ($H_2O$) and a carbon oxide. No solid particulate is produced, and the combustion products are essentially smoke-free. Also, since no solid inorganic oxidizing agent, such as potassium nitrate, strontium nitrate, potassium perchlorate, or metal oxide, is used in conjunction with the GAP or cured GAP, no particulate liquid or solid product requiring a filter is produced. The absence of a filter results in a significant reduction in the weight and manufacturing costs of the inflator assembly 10.

Another advantage associated with the body 80 of pyrotechnic material consisting essentially of GAP or cured GAP is that the GAP or cured GAP produces a large amount of heat per unit of weight of pyrotechnic material. For instance, a pyrotechnic material comprising an organic fuel which is not self-combustible must also comprise a substantial amount of an inorganic oxidizing agent. With the use of GAP or cured GAP, no inorganic oxidizing agent is required. Pound-for-pound, the GAP or cured GAP produces approximately seven times more heat than a commonly used pyrotechnic material in inflators. This allows the use of much less pyrotechnic material, further reducing the weight and cost of the inflator assembly 10.

By being self-extinguishing at atmospheric pressure, GAP or cured GAP can be safely processed, handled and formed, for instance by extrusion or pressure molding, into the grain configuration of FIG. 2. It has sufficient plasticity to permit such forming. GAP or cured GAP is a solid polymeric material which is conventionally used as a binder for rocket fuels. Accordingly, when molded into the grain configuration of FIG. 2, it can withstand the normal forces to which it may be exposed during handling, shipping and vehicle use.

Stored Gas

The stored gas 30 is preferably stored in the container 12 at a pressure of approximately 500 to about 5,000 psi, preferably about 1,000 psi to about 3,500 psi. At these pressures, the GAP or cured GAP is self-combustible and reliably ignites and burns. The stored gas 30 preferably is, at least predominantly, an inert gas, but may contain a small amount of an oxidizer gas. A preferred oxidizer gas is oxygen. A preferred inert gas is argon. Other inert gases which can be used include helium and nitrogen, and mixtures of argon, helium, and nitrogen. The stored gas can also be air. Air consists, on a weight basis, of the inert gases nitrogen and argon, in the amounts of about 75.5% and 1.3% respectively, and oxygen, in the amount of about 23.2%. Also, a mixture of air and an inert gas such as argon can be used.

Since the GAP or cured GAP is self-combustible under pressure, the GAP or cured GAP does not require the presence of any oxygen at all, or any other oxidizing agent, to burn. However, the presence of some oxygen is preferred to oxidize whatever carbon monoxide (CO) may be produced, during the combustion of the GAP or cured GAP, to carbon dioxide ($CO_2$). For the combustion of one gram of GAP or cured GAP, to heat about 23 grams of argon from room temperature to about 2400° F., about one and one-half grams of oxygen may be required to oxidize carbon monoxide (CO) to carbon dioxide ($CO_2$). This amounts to about 6% oxygen based on the total weight of the stored gas 30. Normally, unless the stored gas 30 is air alone, the amount of oxygen in the stored gas will be less than 23.2%.

The present invention is illustrated in the following examples.

EXAMPLE 1

An inflator having a configuration similar to that of FIG. 1 contains four grams of cured GAP made by curing GAP prepolymer, marketed by 3M Company under the trade designation "3M GAP 5527", with an isocyanate. The inflator also contains a stored gas mixture which consists of 90 grams of argon and six grams of oxygen. The stored gas is pressurized at 1,000 psi.

On ignition, the cured GAP decomposes into a decomposition product with a high heat release which heats the stored gas. This produces an inflation fluid which consists essentially of argon, carbon dioxide, water and nitrogen.

By computer modeling, the following results were obtained:

TABLE 1

| Ingredient | Gram Atoms in Gas Mixture |
|---|---|
| Ar | 2.253 |
| $CO_2$ | 0.131 |
| $H_2O$ | 0.109 |
| $N_2$ | 0.056 |
| T(°K.) | 1602 |
| T(°F.) | 2424 |
| Total Heat Content (calories per gram) | 200.4 |
| Sensible Heat Content (calories per gram) | 188.9 |

The inflation fluid, on expansion to about atmospheric pressure, decreases in temperature to 1340° K. (1952° F.). This is an acceptable temperature for a vehicle occupant protection device.

The volume and pressure of the inflation fluid at 1340° K. are effective to protect a vehicle occupant.

This Example illustrates that a small amount of cured GAP (4 grams) has a high heat release which is capable of heating a substantial volume of the stored argon (90 grams) to a high temperature (1602° K.). The decomposition product contains no particulate, so filtration is unnecessary. The small amount of oxygen in the stored gas (6 grams) is effective to oxidize whatever carbon monoxide is formed to carbon dioxide.

By using a self-combustible organic polymer, the stored gas can be predominantly an inert gas.

EXAMPLE 2

The same inflator of Example 1 contains 4 grams of cured GAP prepared in the same manner as in Example 1. However, the stored gas comprises 96 grams of air. On ignition, the cured GAP decomposes, producing an inflation fluid which consists essentially of nitrogen, oxygen, carbon dioxide and water.

By computer modeling, the following results are obtained:

TABLE 2

| Ingredient | Gram Atoms in Gas Mixture |
|---|---|
| $N_2$ | 2.645 |
| $O_2$ | 0.530 |
| $CO_2$ | 0.131 |
| $H_2O$ | 0.109 |
| T(°K.) | 1022 |
| T(°F.) | 1381 |

The heat content which is produced is the same as in Example 1.

On expansion to atmospheric pressure, the temperature of the inflation fluid decreases to 338° K. (148° F.).

The amount and pressure of the inflation fluid are sufficient to inflate the vehicle occupant protection device.

From the above description of the invention, those skilled in the art will perceive improvements, changes and modifications. For instance, the body 80 of pyrotechnic material can be outside of the container 12 and, on combustion, still provide heat which heats the stored gas 30 within the container, as shown in U.S. Pat. No. 5,468,015. The body 80 of pyrotechnic material can be exposed to the same pressure of the stored gas or under an elevated pressure different from the pressure of the stored gas. Such improvements, changes and modifications within the skill of the art are intended to be covered by the appended claims.

Having described the invention, the following is claimed:

1. A hybrid inflator apparatus for inflating a vehicle occupant protection device, said apparatus comprising:

a) a container for storing gas;

b) a gas stored in said container at an elevated pressure, said gas being predominantly an inert gas;

c) a body of ignitable material within said apparatus for heating said stored gas;

d) an elevated pressure environment for said body of ignitable material; and e) an igniter for igniting said body of ignitable material;

said body of ignitable material consisting essentially of a solid organic polymer which is self-combustible at elevated pressure and is self-extinguishing at atmosphere pressure.

2. The apparatus of claim 1 wherein said body of solid organic polymer is within said container and is under the elevated pressure of said stored gas.

3. The apparatus of claim 2 wherein said solid organic polymer consists essentially of atoms of carbon, hydrogen, nitrogen and oxygen and decomposes with the production of heat, when under pressure and ignited, to a decomposition product comprising carbon oxide, water vapor and nitrogen.

4. The apparatus of claim 3 wherein said solid organic polymer is a glycidyl azide polymer and said elevated pressure is above about 500 psi.

5. The apparatus of claim 1 wherein said body of ignitable material is within said container and is exposed to the pressure of the stored gas in said container and the pressure of the stored gas is above about 500 psi.

6. The apparatus of claim 5 wherein said inert gas is selected from the group consisting of argon, nitrogen, helium and mixtures thereof.

7. The apparatus of claim 6 wherein said stored gas comprises a small amount of oxygen effective to oxidize a monoxide gas produced in the decomposition of said solid organic polymer.

8. The apparatus of claim 1 wherein said solid organic polymer is a cured glycidyl azide polymer.

9. The apparatus of claim 8 wherein the amount of said solid organic polymer is an amount effective to heat and increase the pressure of said stored gas.

10. The apparatus of claim 9 wherein said body of solid organic polymer comprises at least one passage extending within the body.

11. The apparatus of claim 1 wherein the contents of said apparatus are essentially free of materials comprising halogen atoms and the products of combustion of the solid organic polymer are essentially smoke-free.

12. The apparatus of claim 11 wherein said solid organic polymer is a cured glycidyl azide polymer and said stored gas is predominantly argon or nitrogen and comprises a small amount of oxygen.

13. The apparatus of claim 1 wherein said solid organic polymer produces combustion products which are essentially free of particulate at the temperature in said container during combustion and said apparatus comprises a passageway communicating said container with the vehicle occupant protection device, said passageway being unobstructed by a filter.

14. A hybrid inflator apparatus for inflating a vehicle occupant protection device, said apparatus comprising:
   a) a container for storing gas;
   b) a gas stored in said container at an elevated pressure, said stored gas being at least predominantly an inert gas;
   c) a body of ignitable material within said apparatus for heating said stored gas;
   d) an elevated pressure environment for said body of ignitable material; and
   e) an igniter for igniting said body of ignitable material;
   said body of ignitable material consisting essentially of a solid organic polymer which is self-combustible at elevated pressure;
   said body of ignitable material comprising at least one passage extending within the body;
   said organic polymer having sufficient plasticity to permit its extrusion or molding at room temperature into said body and being self-extinguishing at atmospheric pressure.

15. The apparatus of claim 14 wherein said solid organic polymer is a glycidyl azide polymer or a cured glycidyl azide polymer.

16. An inflatable vehicle occupant protection device comprising:
   a) a container for storing gas;
   b) a gas stored in said container under pressure, said gas being at least predominantly an inert gas;
   c) a fluid communication means for conveying stored gas from said container, said fluid communication means being free of a filter;
   d) a body of ignitable material within said apparatus under an elevated pressure above atmospheric pressure, said body consisting essentially of a solid organic polymer which is self-combustible at said elevated pressure and comprising atoms of carbon, hydrogen, nitrogen, and oxygen, said body of ignitable material comprising passages extending within said body, said solid organic polymer having sufficient plasticity to permit its extrusion or molding at room temperature into said body and being self-extinguishing at atmospheric pressure;
   e) an igniter for igniting said body of ignitable material.

17. The device of claim 16 wherein said solid organic polymer is a glycidyl azide polymer or a cured glycidyl azide polymer.

* * * * *

UNITED STATES PATENT AND TRADEMARK OFFICE
CERTIFICATE OF CORRECTION

PATENT NO.   : 5 743 557
DATED        : April 28, 1998
INVENTOR(S)  : Ron J. Butt It is certified that error appears in the above-indentified patent and that said Letters Patent is hereby corrected as shown below:

Cover Page, Assignee section, change "Amphenol-Tuchel Electronics GmbH, Heilbronn, Germany" to --TRW Inc., Lyndhurst, Ohio--.

Cover Page, Attorney, Agent, or Firm section, change "Bacon & Thomas" to --Tarolli, Sundheim, Covell, Tummino & Szabo--.

Signed and Sealed this

Seventeenth Day of November, 1998

Attest:

BRUCE LEHMAN

*Attesting Officer*     *Commissioner of Patents and Trademarks*